(12) United States Patent
Ghormley (10) Patent No.: US 7,413,153 B1
(45) Date of Patent: Aug. 19, 2008

(54) REMOVABLE FASTENING SYSTEM

(75) Inventor: Arnold Bennett Ghormley, Pasadena, TX (US)

(73) Assignee: GAF Innovative Products, Inc., Pasadena, TX (US)

( * ) Notice: Subject to any disclaimer, the term of this patent is extended or adjusted under 35 U.S.C. 154(b) by 0 days.

(21) Appl. No.: 11/934,429

(22) Filed: Nov. 2, 2007

Related U.S. Application Data (60) Provisional application No. 60/967,305, filed on Sep. 4, 2007.

(51) Int. Cl.
*A47B 96/06* (2006.01)
*F16L 3/08* (2006.01)

(52) U.S. Cl. .................. 248/229.2; 248/74.1; 174/172; 24/339; 24/563

(58) Field of Classification Search .............. 248/229.2, 248/75, 74.1, 74.3, 229.29, 104; 70/456 R; 24/339, 563, 131 C, 546, 550; 16/225, 226, 16/227; 174/44, 172, 173
See application file for complete search history.

(56) References Cited

U.S. PATENT DOCUMENTS

| | | | | |
|---|---|---|---|---|
| 1,808,328 A | * | 6/1931 | Thomson | 248/74.1 |
| 1,986,861 A | * | 1/1935 | Starr | 248/62 |
| 3,003,727 A | * | 10/1961 | Medor | 248/104 |
| 3,197,099 A | * | 7/1965 | Doba | 224/148.4 |
| 3,204,901 A | * | 9/1965 | Dunu | 248/74.3 |
| 3,288,918 A | * | 11/1966 | Schlein | 174/173 |
| 3,313,503 A | * | 4/1967 | Mayr | 248/60 |
| 4,324,147 A | * | 4/1982 | Crawford, III | 74/37 |
| 4,733,021 A | * | 3/1988 | Weir | 174/173 |
| 4,735,388 A | * | 4/1988 | Marks | 248/103 |
| 6,135,397 A | * | 10/2000 | Santa Cruz et al. | 248/74.1 |
| D470,034 S | * | 2/2003 | Wu et al. | D8/356 |
| 6,648,279 B1 | * | 11/2003 | Malin et al. | 248/65 |

* cited by examiner

*Primary Examiner*—Anita M King
(74) *Attorney, Agent, or Firm*—Buskop Law Group, PC; Wendy Buskop

(57) ABSTRACT

A removable fastening system comprising a first flexible flat metal spiral for wrapping around a first object and a second flexible flat metal spiral for wrapping around a second object. A non-removable rotating pin engages the first flexible flat metal spiral on a first side opposite the first object, and engages the second flexible flat metal spiral on a second side opposite the second object. The second object tensions the removable fastening system while the removable fastening system is connected to the first object. The first flexible flat metal spiral dissipates a first force along a longitudinal axis of the first object, and the second flexible flat metal spiral dissipates a second force along a longitudinal axis of the second object, enabling the first flexible flat metal spiral to support the second object.

13 Claims, 5 Drawing Sheets

REMOVABLE FASTENING SYSTEM

FIELD

The present embodiments relate to a removable fastening system for supporting one or more second objects using a first object, pre-tensioned flexible flat metal spirals, and a non-removable rotating pin.

BACKGROUND

A need exists for a removable fastening system that is fast and inexpensive to manufacture, using lightweight, cost-effective materials.

A further need exists for a removable fastening system that is fast and easy to manipulate and install, allowing a small number of individuals to rapidly secure one or more objects with no special skills or training, and allowing individuals with limited manual dexterity, such as children, elderly persons, or persons with physical disabilities, to install the removable fastening system with ease.

A need exists for a removable fastening system that can be encoded to enable visual differentiation of objects having a similar appearance, such as by coloring fasteners securing a water hose blue and coloring fasteners securing an air conditioning conduit red.

A need also exists for a removable fastening system that provides 360 degrees of rotation, allowing one or more second objects oriented at any angle in relation to any first object to be secured to and supported using the first object.

A need exists for a removable fastening system that can be secured to a wide variety of objects having any shape or material, using individual fasteners, such as for holding individual discrete items, or using a plurality of fasteners for securing lengthy items, such as hoses or cables.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a removable fastening system for supporting one or more second objects using one or more first objects, pre-tensioned flexible flat metal spirals, and a non-removable rotating pin.

A first flexible flat metal spiral with a first tension for wrapping around an exterior of a first object is connected to a second flexible flat metal spiral with a second tension for wrapping around an exterior of a second object by a non-removable rotating pin. The first and second tension cause the first and second flexible flat metal spirals, respectively, to coil into a ring when not engaging an object.

The non-removable rotating pin engages the first flexible flat metal spiral on a first side opposite the first object at an angle ranging from about 170 degrees to about 190 degrees from the first object. The non-removable rotating pin engages the second flexible flat metal spiral on a second side opposite the second object at an angle ranging from about 170 degrees to about 190 degrees from the second object.

The second object tensions the removable fastening system while the removable fastening system is connected to the first object. The first flexible flat metal spiral dissipates a first force along the longitudinal axis of the first object, and the second flexible flat metal spiral dissipates a second force along the longitudinal axis of the second object, enabling the first flexible flat metal spiral to support the second object.

The present removable fastening system is both versatile, and easy and efficient to utilize. Through use of flexible flat metal spirals, a wide variety of objects, having any exterior shape, formed from any material, such as tubular pipes, square rafters, vertical and horizontal supports, hoses, leads, conduits, and cables can be engaged. A second flexible flat metal spiral can in turn support and suspend individual objects, such as shop supplies, safety equipment, tools, signs, clothing, and other similar objects. A plurality of fasteners can be used to support and suspend longer items, such as flexible hoses or cables.

The present removable fastening system further provides the benefit of 360 degrees of rotation and angulations through use of a flexible rotating pin connecting two flexible flat metal spirals. The flexibility and rotation of the pin allows the present removable fastening system to be used to simultaneously connect to plumbing pipes, hoses, cables, and similar objects that extend along different vertical and horizontal planes, such as cords or pipes that run perpendicular to one another. Objects that extend at any angle in relation to one another can be simultaneously secured using the present removable fastening system.

For example, residential wiring in an attic, which is typically laid upon ceiling joists, can be suspended from attic rafters, away from areas in an attic where individuals may walk. Likewise, plumbing and air conditioning ducts can be suspended at the level of rafters rather than in an attic walking area. The present removable fastening system is also useful in an industrial setting, such as for supporting hoses, wires, extension cords, and similar objects to overhead pipes or structural steel, rather than laying objects in heavily trafficked areas or on areas of the ground that can become wet. In an office setting, the present removable fastening system can be used to suspend computer cables and other cords underneath desks or along ledges, rather than in leg space or walking areas. In a health care facility, the present removable fastening system can be used to suspend patient cords and intravenous lines to prevent tripping hazards, interference with wheelchairs, hospital beds, and other rolling objects, and potential injury to a patient that can occur as a result of interrupted cords or lines.

The present removable fastening system can be used to bundle similar items, such as insulated extension cords, in a compact, longitudinal fashion, or at angles up to 360 degrees, preventing multiple cords and similar items from presenting an unsightly mess, or from presenting a safety hazard. Cords, cables, wires, hoses, and similar flexible objects that are not secured and/or suspended can often cause persons in a room to trip, suffering injury, while potentially damaging or disconnecting one or more objects.

Another advantage of the present removable fastening system is provided by spacing apart the two flexible flat metal spirals using the non-removable rotating pin, to separate secured objects. This separation allows objects having differing temperatures, such as a hose containing steam and a hose containing cool water, to be secured by the same fastener, with a separation to prevent heat transfer between the secured objects. Likewise, the present removable fastening system can be used to prevent corrosion or chemical degradation by securing two differing metals, or other materials that can be subject to corrosion or degradation, while maintaining a space between the secured objects.

The present removable fastening system can snugly secure suspended objects, which can prevent abrasion to suspended objects that may otherwise be subjected to vibrations or scraping, which can fray secured items and cause leaks in pipes and hoses.

The present removable fastening system can also be provided with aesthetic coatings or constructed from aesthetic materials, for use as part of a décor in a room. Additionally, special lighting, objects, or interior cables or hoses can be suspended in an aesthetic manner using one or more fasteners.

Objects secured by the first flexible flat metal spiral can include pipes, rafters, hoses, cables, metal or wooden supports, or any other object having a length larger than its width. Objects secured by the second flexible flat metal spiral can include cords, cables, hoses, and other objects similar to those able to be secured by the first flexible flat metal spiral. A series of removable fasteners can be used to secure a long object, such as an industrial air conditioning hose, a fiber optic cable, or other similar objects.

The second flexible flat metal spiral can also be used to secure discreet individual objects, such as tools, shop supplies, signs, articles of clothing or safety equipment, and other similar articles having any shape or dimensions.

Each flexible flat metal spiral can be used to secure any object, regardless of the shape or material of the object. For example, the first flexible flat metal spiral can be secured around a square wooden rafter, while the second flexible flat metal spiral is secured around a round rubber hose.

Each flexible flat metal spiral can be made from any metal, and in a contemplated embodiment, one or both flexible flat metal spirals can be made from tensioned spring steel. Both flexible flat metal spirals can be made from the same metal or from different metals.

It is contemplated that the metal of one or both flexible flat metal spirals can be perforated for reducing the cost of the present removable fastening system and for reducing the weight of the flexible flat metal spirals to facilitate easier transport and use. Perforations in the flexible flat metal spirals can also be used to receive objects, such as locking mechanisms that engage perforations through two overlapping arcs of a perforated flexible flat metal spiral, to prevent accidental disengagement of the perforated flexible flat metal spiral from a secured object. Perforations in the flexible flat metal spirals could also receive hooks or similar fasteners for holding items external to the flexible flat metal spirals. It is also contemplated that perforations in the flexible flat metal spirals can receive aesthetic or decorative items, or any other type of item that can fit within any of the perforations.

In an embodiment, one or both of the flexible flat metal spirals can be made from a meshed metal.

Each flexible flat metal spiral can have any length sufficient to wrap around the exterior of one or more secured objects. In a contemplated embodiment, one or both flexible flat metal spirals can have a length of at least 1.5 times the perimeter of an object to be secured. Each flexible flat metal spiral can have the same length or a different length.

In an embodiment, each flexible flat metal spiral can have a width ranging from about 0.125 inches to about 6 inches, and a thickness ranging from about 0.1 inches to about 0.5 inches. Each flexible flat metal spiral can have identical widths or different widths, and each flexible flat metal spiral can have identical thicknesses or differing thicknesses.

It is contemplated that the first flexible flat metal spiral can coil to form a first ring when not engaging a first object. The second flexible flat metal spiral can coil to form a second ring when not engaging a second object. One or both flexible flat metal spirals can have metallurgical memory, enabling the flexible flat metal spirals to repeatedly extend, support objects, retract after repeated use, and be reused without experiencing significant deformation.

The first tension provided by the first flexible flat metal spiral can be equal to the second tension provided by the second flexible flat metal spiral. In an embodiment, the first flexible flat metal spiral and the second flexible flat metal spiral can have differing tensions. The tension provided by each flexible flat metal spiral is contemplated to be sufficient to secure objects weighing as much as 50 pounds or more.

In an embodiment, one or both of the flexible flat metal spirals can have a coating, such as an abrasion-resistant coating or a rust-resistant coating, which can include rubber, amorphous plastic, curable flexible pigments, and other similar coatings. Useable coatings can also include aesthetic coatings, such as colored paint, textured coatings to provide an improved grip for ease of use, coatings of a non-conducting material, such as rubber, to minimize safety risks when using the present removable fastening system to secure electrical wiring, and other similar coatings. It is contemplated that coatings can be generally thin, having a thickness ranging from about 1 micron to about 10 microns.

In a contemplated embodiment, the non-removable rotating pin can be flexible, able to bend at an angle ranging from about 90 degrees to about 180 degrees, enabling the first flexible flat metal spiral to be positioned at an angle in relation to the second flexible flat metal spiral. For example, the first flexible flat metal spiral can be oriented in a horizontal plane for securing around a vertical pipe or similar vertical support, while the second flexible flat metal spiral can be oriented in a vertical plane for securing a horizontal cable that runs perpendicular to the vertical pipe. In another contemplated embodiment, the flexible non-removable rotating pin can be hinged to allow each flexible flat metal spiral to be provided with selected orientations.

In an embodiment, the non-removable rotating pin can be adapted to angulate the first object at an angle greater than zero degrees from the second object.

It is contemplated that the non-removable rotating pin can be adapted to provide 360 degrees of rotation for each of the flexible flat metal spirals, enabling objects that extend perpendicular to one another in a horizontal or vertical plane to be simultaneously secured by the present removable fastening system.

In a contemplated embodiment, the non-removable rotating pin can be made from non-conducting materials, such as fiberglass-impregnated plastic. This embodiment is of particular use when one or both of the flexible flat metal spirals are used to secure electrical cables or wiring, when conduction across the removable fastening system could create a safety hazard, allowing users of the removable fastening system to potentially experience a shock, or cause a short circuit, damaging or destroying costly equipment.

In an embodiment, the non-removable rotating pin can be a solid or hollow cylinder, having a diameter ranging from about 0.1875 inches to about 2 inches, and a length ranging from about 0.5 inches to about 6 inches.

Figure 1:
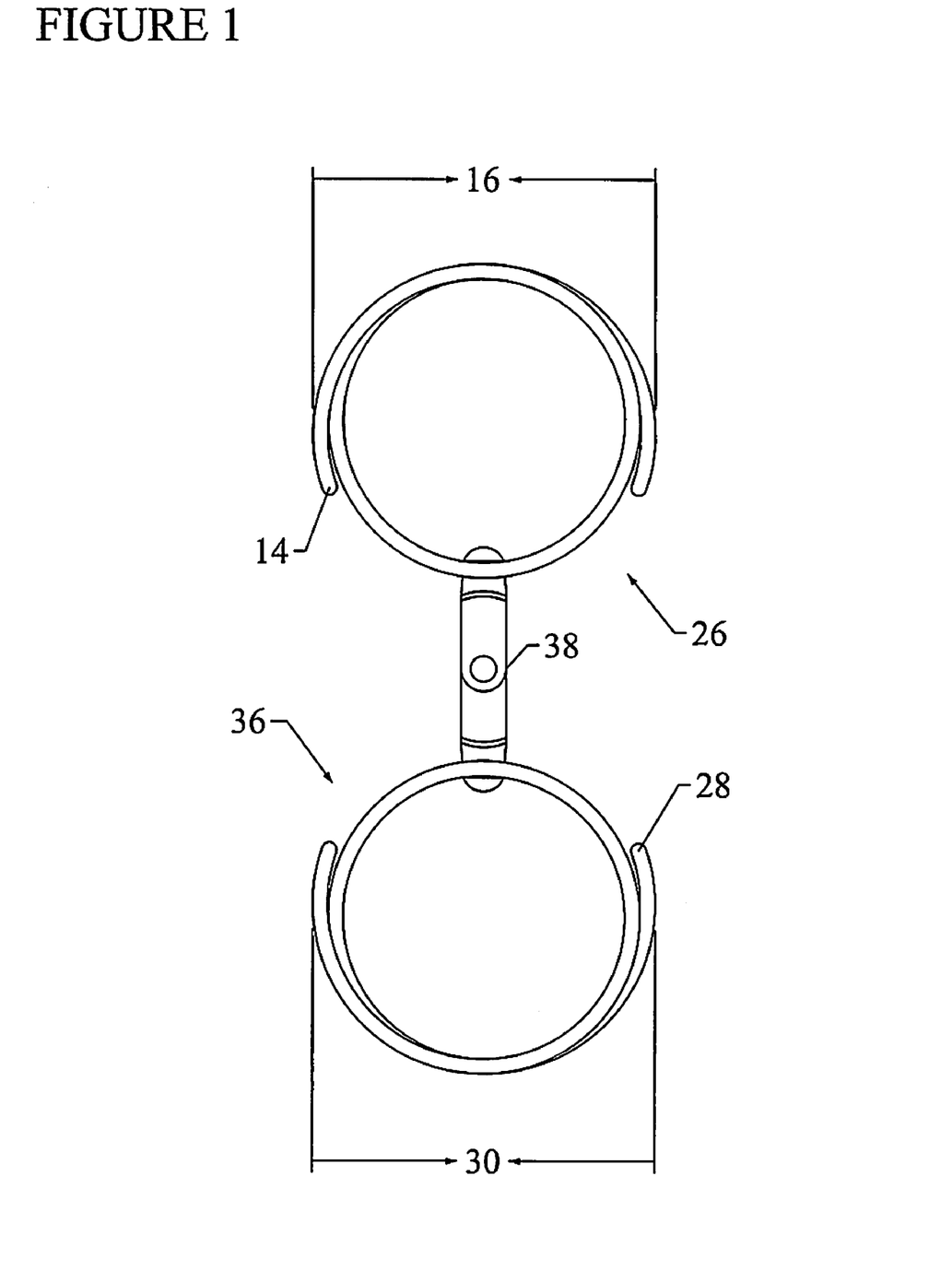
FIG. 1 depicts a side view of an embodiment of the present removable fastener in a coiled position.

Referring now to FIG. 1, a side view of an embodiment of the present removable fastening system is depicted.

A first flexible flat metal spiral (14), which can be made from tensioned spring steel, aluminum, iron, nickel, and other similar metals or alloys, is shown having a first tension (16) for maintaining the first flexible flat metal spiral (14) in a coiled position. The depicted first flexible flat metal spiral (14) is contemplated to have a length of 12 inches, a width of 1 inch, and a thickness of 0.125 inches.

When not engaging an object, the first tension (16) causes the first flexible flat metal spiral (14) to coil to form a first ring (26). The diameter of the first ring (26) can depend on the length of the first flexible flat metal spiral (14) and the strength of the first tension (16). For example, a flexible flat metal spiral having a length of 12 inches and a strong tension may coil to form a ring having a diameter of 2 inches.

A second flexible flat metal spiral (28) having a substantially similar configuration and substantially similar dimensions to first flexible flat metal spiral (14) is shown having a second tension (30) for maintaining the second flexible flat metal spiral (28) in a coiled position.

While FIG. 1 depicts the second flexible flat metal spiral (28) having substantially identical dimensions to the first flexible flat metal spiral (14), it is contemplated that each flexible flat metal spiral can have differing dimensions. For example, the second flexible flat metal spiral (28) can have a length of 6 inches, a width of 0.5 inches, and a thickness of 0.125 inches, for use securing a small bundle of wires, while the first flexible flat metal spiral (14) is secured to a cylindrical pipe having a diameter of 3 inches.

When not engaging an object, the second flexible flat metal spiral (28) coils to form a second ring (36).

A non-removable rotating pin (38) is shown engaging the first flexible flat metal spiral (14) and the second flexible flat metal spiral (28). The non-removable rotating pin (38) can be hollow or solid and can be made from any metallic or non-metallic material, such as stainless steel, plastic, fiberglass, or combinations thereof.

The depicted non-removable rotating pin (38) is contemplated to be a cylinder having a length of approximately 1 inch and a diameter of approximately 0.5 inches.

The non-removable rotating pin (38) is contemplated to provide both first flexible flat metal spiral (14) and second flexible flat metal spiral (28) with 360 degrees of rotation, enabling each flexible flat metal spiral to have any orientation with respect to the other flexible flat metal spiral along a horizontal or vertical plane.

For example, the first flexible flat metal spiral (14), the second flexible flat metal spiral (28), or combinations thereof can be rotated such that the flexible flat metal spirals are horizontally perpendicular, able to engage objects that extend in perpendicular directions.

FIG. 1 depicts the first flexible flat metal spiral (14) and the second flexible flat metal spiral (28) in a substantially parallel orientation.

The non-removable rotating pin (38) can also be flexible and/or hinged, enabling each flexible flat metal spiral to have any orientation with respect to the other flexible flat metal spiral along a horizontal or vertical plane.

For example, the non-removable rotating pin (38) can be hinged or bent, such that the first flexible flat metal spiral (14) and the second flexible flat metal spiral (28) are substantially vertically perpendicular.

Figure 2:
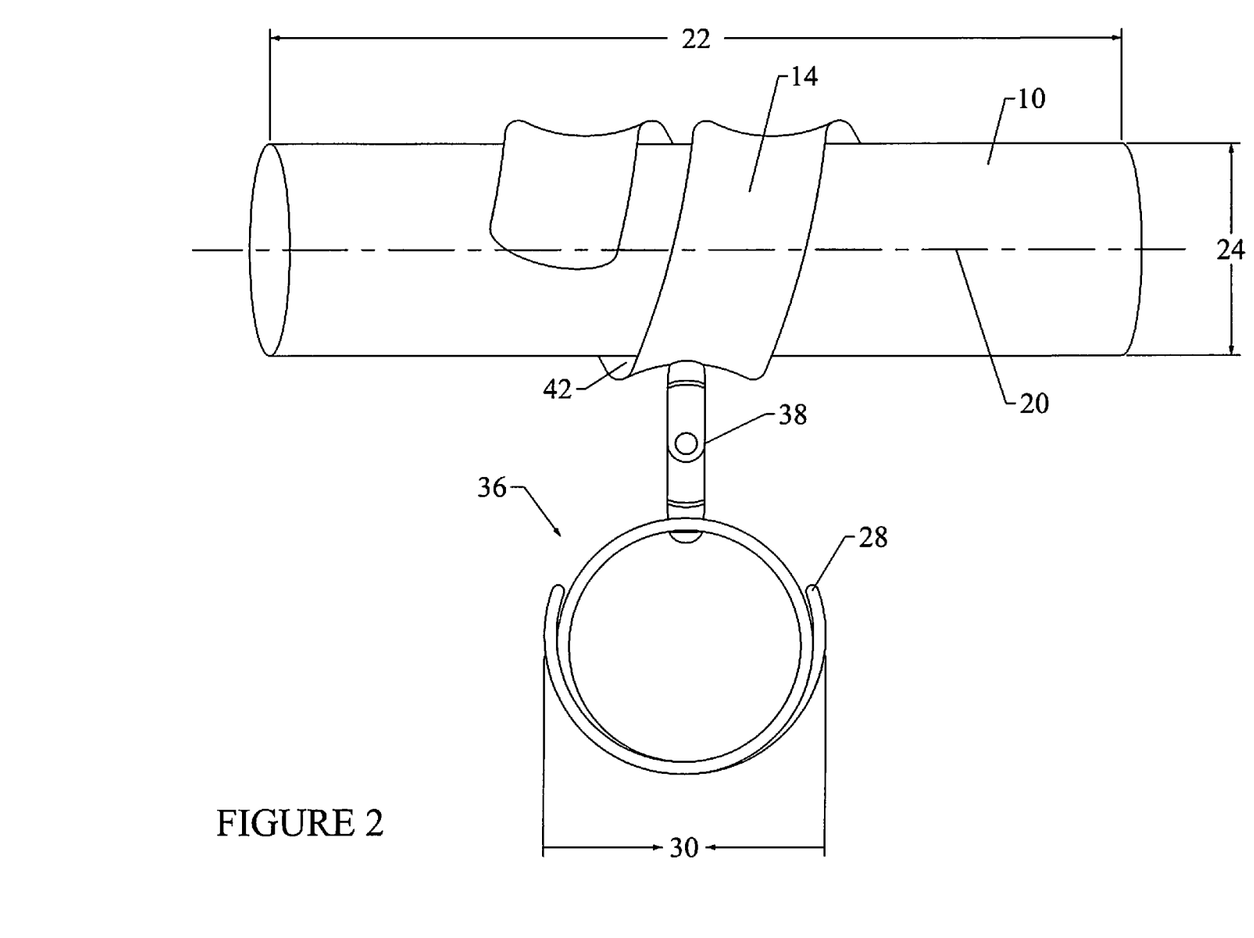
FIG. 2 depicts a perspective view of an embodiment of a removable fastener engaging an object.

Referring now to FIG. 2, a perspective view of an embodiment of the present removable fastening system is shown engaging an object.

A first flexible flat metal spiral (14) is shown wrapped around a first object (10). The first object (10), which is depicted as a tubular rod, has a first longitudinal axis (20) and a length (22), such as 24 feet, that is larger than a width (24) of the first object (10), such as a diameter of 3 inches.

The tension of the first flexible flat metal spiral (14) secures the first flexible flat metal spiral (14) to the first object (10). It is contemplated that the first flexible flat metal spiral (14) snugly and securely wraps around the first object (10), and that the flexibility of the first flexible flat metal spiral (14) allows the first flexible flat metal spiral (14) to extend along the exterior contours of the first object (10).

Thus, if the first object (10) had a shape other than round, such as a square, a rectangular rafter, or horizontal support, the first flexible flat metal spiral (14) would wrap around the square or rectangular perimeter of the rafter, owing to the flexibility of the first flexible flat metal spiral (14).

A second flexible flat metal spiral (28) is shown having a second tension (30) for maintaining the second flexible flat metal spiral (28) in a closed position. When not engaging an object, the second flexible flat metal spiral (28) coils to form a second ring (36).

A non-removable rotating pin (38) is shown engaging the first flexible flat metal spiral (14) on a first side (42) opposite the first object (10). The point of engagement of the non-removable rotating pin (38) on the first side (42) opposite the first object (10) can be at an angle, such as 170 degrees, opposite the first object (10).

The non-removable rotating pin (38) is also shown engaging the second flexible flat metal spiral (28). The second flexible flat metal spiral (28) is shown in a substantially horizontally perpendicular orientation with respect to the first flexible flat metal spiral (14).

The non-removable rotating pin (38) is contemplated to provide both the first flexible flat metal spiral (14) and the second flexible flat metal spiral (28) with 360 degrees of rotation, enabling each flexible flat metal spiral to be rotated to have any orientation with respect to the other flexible flat metal spiral along a horizontal plane.

The non-removable rotating pin (38) can also be hinged or flexible, enabling each flexible flat metal spiral to be positioned at any angle with respect to the other along a vertical plane by bending or hinging the non-removable rotating pin (38).

Figure 3:
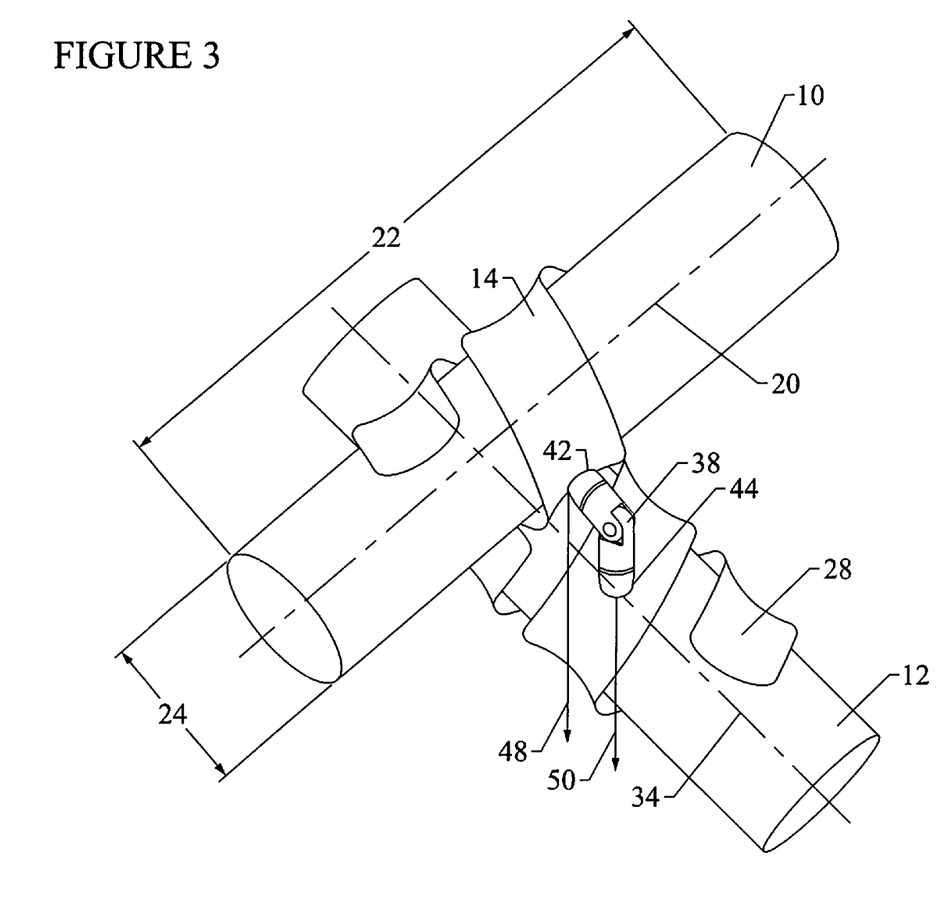
FIG. 3 depicts a perspective view of an embodiment of the removable fastener engaging a first object and a second object.

Referring now to FIG. 3, a perspective view of an embodiment of the present removable fastening system is shown engaging a first object and a second object.

A first flexible flat metal spiral (14) is shown wrapped around a first object (10), which is depicted as a tubular pipe. The first object (10) has a first longitudinal axis (20) and a length (22), such as 36 feet, that is larger than its width (24), such as a diameter of four inches.

A second flexible flat metal spiral (28) is shown wrapped around a second object (12), which is depicted as a cylindrical hose, such as a hose having a length of 28 feet and a diameter of four inches. The second object (12) has a second longitudinal axis (34). The second object (12) is depicted extending substantially horizontally perpendicular to the first object (10), and a distance, such as about 4 inches, beneath the first object (10).

A non-removable rotating pin (38) is shown engaging the first flexible flat metal spiral (14) on a first side (42) opposite the first object (10), at an angle of about 130 degrees opposite the first object (10). The non-removable rotating pin (38) also engages the second flexible flat metal spiral (28) on a second side (44) opposite the second object (12), at an angle of about 180 degrees opposite the second object (12).

The non-removable rotating pin (38) is contemplated to provide both the first flexible flat metal spiral (14) and the second flexible flat metal spiral (28) with 360 degrees of rotation, enabling each flexible flat metal spiral to have any orientation with respect to the other flexible flat metal spiral along a horizontal plane.

The second flexible flat metal spiral (28) is shown in a substantially horizontally perpendicular orientation with respect to the first flexible flat metal spiral (14), allowing the depicted removable fastener to simultaneously engage the first object (10) and the second object (12), which extend in perpendicular directions.

FIG. 3 depicts the second object (12) applying a second force (50) on the second flexible flat metal spiral (28). The second force (50) can be any force depending on the mass of the portion of the second object (12) supported by the second flexible flat metal spiral (28).

For example, if the portion of the flexible hose depicted as second object (12) supported by the second flexible flat metal spiral (28) had a mass of 0.25 kilograms, the second force (50) would be equal to approximately 2.5 N. It is contemplated that the tension of the second flexible flat metal spiral (28) is sufficient to remain secured to the second object (12) while the second force (50) is applied.

The second flexible flat metal spiral dissipates the second force (50) along the second longitudinal axis (34).

The second flexible flat metal spiral (28) in turn applies a first force (48), which is contemplated to be approximately equal to the second force (50), to the first flexible flat metal spiral (14). The first flexible flat metal spiral (14) is contemplated to have a tension sufficient to remain secured to the first object (10) while the first force (48) is applied.

The first flexible flat metal spiral (14) dissipates the first force (48) along the first longitudinal axis (20). By dissipating the first force (48) along the first longitudinal axis (20) of the first object (10), the first flexible flat metal spiral (14) is able to support the second object (12), secured within the second flexible flat metal spiral (28), using the first object (10).

Figure 4:
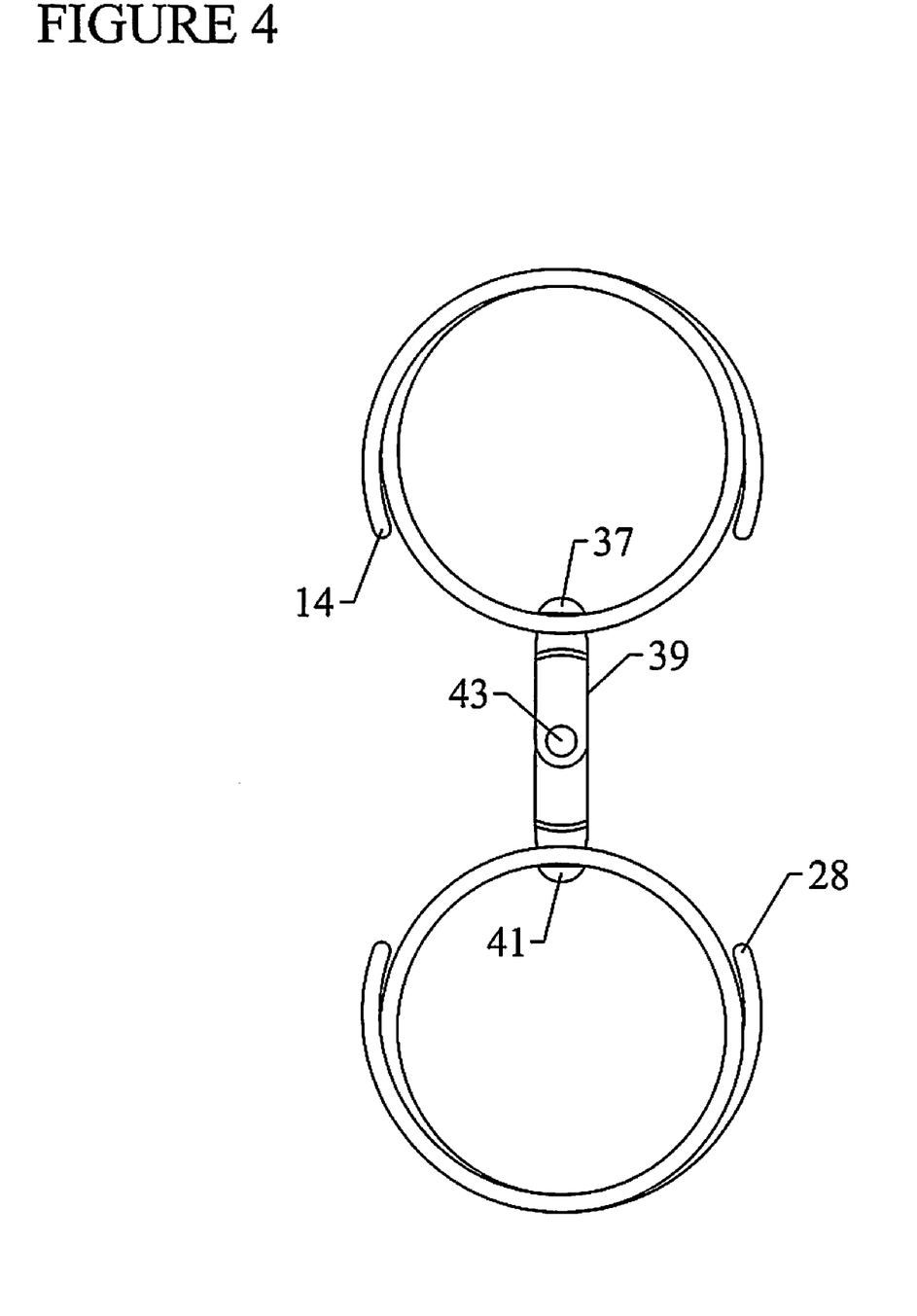
FIG. 4 depicts a side view of an embodiment of a non-removable rotational pin for connecting two flexible flat metal spirals.

Referring now to FIG. 4, a side view of an embodiment of a non-removable rotating pin connecting two flexible flat metal spirals is depicted.

A first flexible flat metal spiral (14) is shown engaged by a first pin head (37) and a pin body (39). A second flexible flat metal spiral (28) is shown engaged by a second pin head (41) and the pin body (39). Each depicted pin head can be a frustroconical shape or a hemispherical shape with a lower diameter of slightly larger than 0.5 inches. The pin body is contemplated to be a cylinder with a length of slightly greater than 1 inch and a diameter of 0.5 inches.

The first flexible flat metal spiral (14) and the second flexible flat metal spiral (28) can have holes or perforations for receiving the pin body (39). The first pin head (37) and second pin head (41) can engage the pin body (39) using fasteners, adhesives, or other types of fastening means that permit each flexible flat metal spiral (14,28) and the pin body (39) to rotate.

In an embodiment, the first pin head (37), second pin head (41), and pin body (39) can be a one-piece construction. It is also contemplated that the first pin head (37), second pin head (41), pin body (39), first flexible flat metal spiral (14), and second flexible flat metal spiral (28) can be a one-piece construction.

It is contemplated that the pin body (39) can freely rotate between the first pin head (37) and the second pin head (41), enabling the first flexible flat metal spiral (14) and the second flexible flat metal spiral (28) to rotate 360 degrees along a horizontal axis.

FIG. 4 depicts the first flexible flat metal spiral (14) and the second flexible flat metal spiral (28) in a substantially parallel orientation along both a horizontal and a vertical axis.

A hinge (43) is depicted in the center of the pin body (39) for allowing the first flexible flat metal spiral (14) and the second flexible flat metal spiral (28) to be oriented in relation to one another at an angle along a vertical axis. The hinge (43) could also be positioned toward either end of the pin body (39), rather than in the center of pin body (39).

Figure 5:
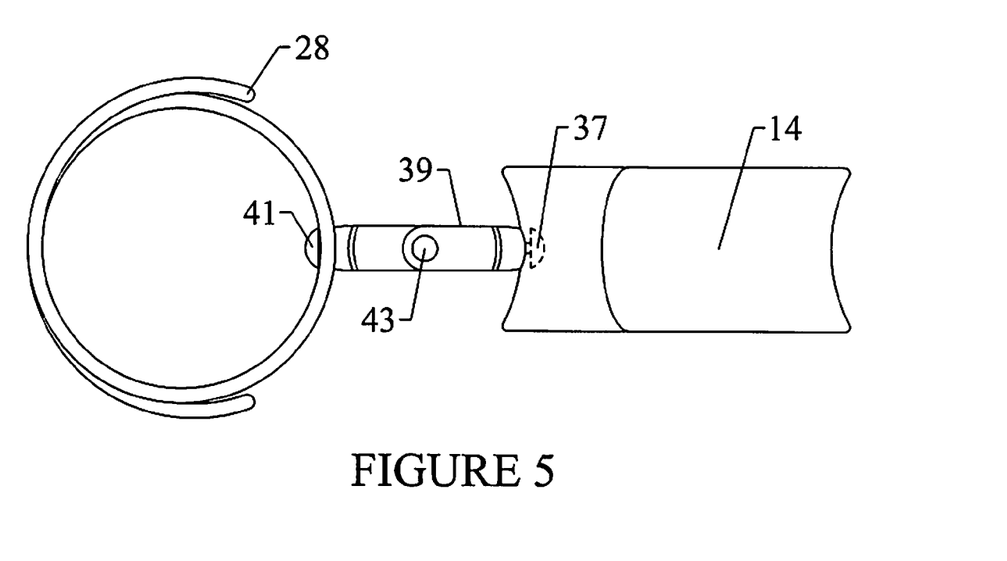
FIG. 5 depicts the non-removable rotational pin of FIG. 4 with one of the flexible flat metal spirals bent horizontally.

Referring now to FIG. 5, the non-removable rotating hinge of FIG. 4 is depicted with one of the flexible flat metal spirals bent horizontally.

The first flexible flat metal spiral (14) is depicted in a substantially perpendicular orientation along a horizontal axis in relation to the second flexible flat metal spiral (28). The first flexible flat metal spiral (14) is shown in a substantially parallel orientation along a vertical axis in relation to the second flexible flat metal spiral (28).

While the flexible flat metal spirals are depicted in a horizontally perpendicular orientation, it is contemplated that the flexible flat metal spirals can be rotated at any angle in relation to one another, such as 60 degrees.

The first flexible flat metal spiral (14) is shown engaging a pin body (39) and a first pin head (37). The second flexible flat metal spiral (28) is shown engaging the pin body (39) and the second pin head (41). Hinge (43) is shown in the center of pin body (39).

Figure 6:
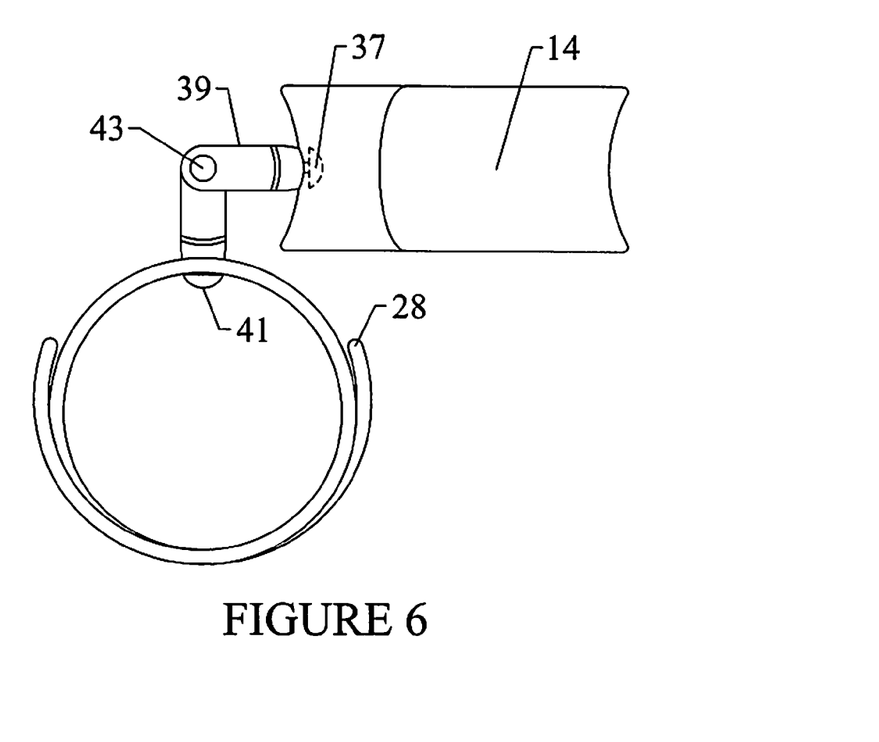
FIG. 6 depicts the non-removable rotational pin of FIG. 5 with one of the flexible flat metal spirals bent vertically.

Referring now to FIG. 6, the non-removable rotating hinge of FIG. 5 is shown with one of the flexible flat metal spirals positioned vertically perpendicular to the other flexible flat metal spiral.

The first flexible flat metal spiral (14) is shown in a substantially perpendicular orientation along both a horizontal and vertical axis in relation to the second flexible flat metal spiral (28). The first flexible flat metal spiral (14) is shown engaging a pin body (39) and a first pin head (37).

The second flexible flat metal spiral (28) is shown engaging the pin body (39) and the second pin head (41). A hinge (43) is shown in the center of the pin body (39). The hinge (43) is depicted at an angle, enabling the first flexible flat metal spiral (14) to be positioned in a perpendicular orientation in relation to the second flexible flat metal spiral (28) along a vertical plane.

While hinge (43) is shown positioning the first flexible flat metal spiral (14) and the second flexible flat metal spiral (28) at a substantially perpendicular angle along a vertical plane, it is contemplated that the flexible flat metal spirals can be positioned at any vertical angle, such as 45 degrees, in relation to one another.

While these embodiments have been described with emphasis on the embodiments, it should be understood that within the scope of the appended claims, the embodiments might be practiced other than as specifically described herein.

What is claimed is:

1. A removable fastening system for supporting a second object using a first object, the removable fastening system comprising:
- a first flexible flat metal spiral with a first tension for wrapping around a first exterior of a first object, wherein the first object has a first object longitudinal axis and a length larger than a width of the first object, and wherein the first tension causes the first flexible flat metal spiral to coil into a first ring when not engaging the first object;
- a second flexible flat metal spiral with a second tension for wrapping around a second exterior of a second object, wherein the second object has a second object longitudinal axis, and wherein the second tension causes the second flexible flat metal spiral to coil into a second ring when not engaging the second object;
- a non-removable rotating pin engaging the first flexible flat metal spiral on a first side opposite the first object at a first angle ranging from 170 degrees to 190 degrees while engaging the second flexible flat metal spiral on a second side opposite the second object at a second angle ranging from 170 degrees to 190 degrees;
- wherein the second object tensions the removable fastening system while the removable fastening system is connected to the first object; and
- wherein the first flexible flat metal spiral dissipates a first force along the first object longitudinal axis while wrapping around the first object and the second flexible flat metal spiral dissipates a second force along the second object longitudinal axis enabling the first flexible flat metal spiral to support the second object.

2. The removable fastening system of claim 1, wherein the first tension is equivalent to the second tension.

3. The removable fastening system of claim 1, wherein the width of the first flexible flat metal spiral is different from a width of the second flexible flat metal spiral.

4. The removable fastening system of claim 1, wherein each flexible flat metal spiral has a length adapted to wrap a secured object at least 1.5 times a perimeter of the secured object.

5. The removable fastening system of claim 1, wherein the non-removable rotating pin is flexible.

6. The removable fastening system of claim 5, wherein the non-removable rotating pin is hinged.

7. The removable fastening system of claim 1, wherein the non-removable rotating pin comprises only non-conducting materials.

8. The removable fastening system of claim 1, wherein the first flexible flat metal spiral, the second flexible flat metal spiral, or combinations thereof comprise a perforated metal.

9. The removable fastening system of claim 8, wherein the perforated metal is a mesh.

10. The removable fastening system of claim 1, wherein the first flexible flat metal spiral, the second flexible flat metal spiral, or combinations thereof have metallurgical memory for repeatedly extending, supporting, and retracting after repeated use.

11. The removable fastening system of claim 1, wherein the first flexible flat metal spiral, the second flexible flat metal spiral, or combinations thereof comprise an abrasion resistant coating, a rust resistant coating, or combinations thereof.

12. The removable fastening system of claim 1, wherein the non-removable rotating pin is adapted to provide 360 degrees of rotation.

13. The removable fastening system of claim 1, wherein the non-removable rotating pin is adapted to angulate the second object at an angle greater than 0 degrees from the first object.

* * * * *